US012454971B2

(12) United States Patent
Sailer et al.

(10) Patent No.: US 12,454,971 B2
(45) Date of Patent: Oct. 28, 2025

(54) COVER FASTENING SYSTEM FOR A VEHICLE

(71) Applicant: Motherson Innovations Company Limited, London (GB)

(72) Inventors: Gottfried Sailer, Stuttgart (DE); Hans-Dieter Pomparew, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 354 days.

(21) Appl. No.: 18/005,395

(22) PCT Filed: Aug. 16, 2021

(86) PCT No.: PCT/EP2021/072712
§ 371 (c)(1),
(2) Date: Jan. 13, 2023

(87) PCT Pub. No.: WO2022/034239
PCT Pub. Date: Feb. 17, 2022

(65) Prior Publication Data
US 2023/0272812 A1    Aug. 31, 2023

Related U.S. Application Data

(60) Provisional application No. 63/065,624, filed on Aug. 14, 2020.

(51) Int. Cl.
*B60R 13/04* (2006.01)
*B60R 13/02* (2006.01)
(Continued)

(52) U.S. Cl.
CPC .......... *F16B 5/126* (2013.01); *B60R 13/0206* (2013.01); *B60R 13/04* (2013.01); *F16B 2/22* (2013.01); *F16B 21/086* (2013.01)

(58) Field of Classification Search
CPC ....... B60R 13/02; B60R 13/04; B60R 13/005; B60R 13/0206; F16B 2/20; F16B 2/22; F16B 21/08; F16B 21/068; F16B 21/086
(Continued)

(56) References Cited

U.S. PATENT DOCUMENTS 4,400,417 A * 8/1983 Kanamori ............. B60R 13/005
280/727
4,861,208 A * 8/1989 Boundy .............. F16B 19/1081
411/908
(Continued)

FOREIGN PATENT DOCUMENTS

| CN | 1420040 A | 5/2003 | |
|---|---|---|---|
| DE | 102011053393 A1 * | 3/2013 | ............. B60R 13/02 |
| FR | 2369449 | 5/1978 | |

OTHER PUBLICATIONS

DE102011053393 Text (Year: 2013).*
(Continued)

*Primary Examiner* — Dennis H Pedder
(74) *Attorney, Agent, or Firm* — Jones Day

(57) ABSTRACT

The present disclosure relates to a cover fastening system for a vehicle external surface comprising: a cover having at least one locking pin arranged on an inner surface of the cover, wherein the at least one locking pin has at least one protrusion; a shell, wherein the shell is mechanically engaged within a slot on a vehicle surface, and wherein the locking pin cooperates with the inner surface of the shell to retain the cover; and a cover fastening method for a vehicle surface.

13 Claims, 10 Drawing Sheets

(51) Int. Cl.
*F16B 2/20* (2006.01)
*F16B 2/22* (2006.01)
*F16B 5/12* (2006.01)
*F16B 21/08* (2006.01)

(58) Field of Classification Search
USPC ...................................... 296/39.1, 1.08, 1.11
See application file for complete search history.

(56) References Cited

U.S. PATENT DOCUMENTS

| | | | | |
|---|---|---|---|---|
| 6,238,157 | B1 * | 5/2001 | Davis, Jr. ................ | F16B 21/06 24/324 |
| 6,769,849 | B2 * | 8/2004 | Yoneoka ............. | F16B 19/1081 411/41 |
| 7,226,364 | B2 * | 6/2007 | Helmstetter ........... | A63B 60/00 473/307 |
| 7,267,385 | B2 * | 9/2007 | Williams ............ | B60R 13/0206 296/29 |
| 7,677,741 | B2 * | 3/2010 | Chuang .................. | B60R 1/082 359/872 |
| 2003/0094828 | A1 * | 5/2003 | Nagamoto .......... | B60R 13/0206 296/39.1 |
| 2004/0020016 | A1 | 2/2004 | Yoneoka | |
| 2009/0103198 | A1 | 4/2009 | Chuang | |

OTHER PUBLICATIONS

International Search Report and Written Opinion dated Dec. 23, 2021 of International application No. PCT/EP2021/072712.
CNIPA, Appl. 202180060840.5, First Office Action, Jul. 8, 2025.

* cited by examiner

COVER FASTENING SYSTEM FOR A VEHICLE

CROSS-REFERENCE TO RELATED APPLICATIONS

This application is a National-Stage Entry of International Patent Application No. PCT/EP2021/072712 filed on Aug. 16, 2021, which claims to benefit of priority to U.S. Provisional Patent Application No. 63/065,624 filed on Aug. 14, 2020, each of which is incorporated by reference in its entirety for all purposes.

BACKGROUND

1. Field

The present disclosure relates to a mechanically attached cover for Class A surfaces on vehicles. More specifically, the present disclosure relates to a cover for concealing slots provided on Class A surfaces, having an attachment mechanism that enables engagement and disengagement of the cover multiple times without causing damage. It also refers to a vehicle with such a cover fastening system.

2. Related Art

With the advent of camera monitoring systems to replace mirrors in vehicles, the slots for screws provided for mirror attachment are left open when a camera system replaces a mirror system for an existing vehicle. These slots reduce the aesthetic appeal of the vehicle surface and typically covers are used to conceal the slots. Attachment elements are used with the cover to provide a secure attachment of the cover on the vehicle surface. Current system attachment elements include an adapter that clips onto vehicle surface in the area to be concealed, a cover and a double sided adhesive tape adhered to the clip and the cover. This arrangement reduces the possibility to disassemble and assemble the covers without replacing the tape and additional use of glue to secure the cover to the vehicle causing inconvenience of use. The present disclosure describes an approach to attaching the cover on to vehicle for concealing the slots having mechanisms allowing multiple assembly/disassembly without functional damage thereby providing greater convenience, reduced complexity and replacement costs.

SUMMARY

It is the object of this disclosure to further develop the known cover fastening systems known in the art to overcome the problems thereof. In particular, a mechanically attached cover for Class A surfaces on vehicles system that overcomes at least some of the stated problems above is to be provided.

One general aspect may include a cover fastening system for a vehicle surface, in particular an external surface. The cover fastening system includes a cover having at least one locking pin arranged on an inner surface of the cover, where the at least one locking pin has at least one protrusion. The system also includes a shell, where the shell is mechanically engaged within a slot on a vehicle external surface; and where the locking pin is configured to cooperate with and is mechanically engaged with the inner surface of the shell to retain the cover.

In one embodiment, of the cover fastening system the at least one locking pin is removable from the shell without functional damage.

Functional damage according to the invention is considered to be structural damage to the locking pin where the locking pin is not capable of retaining the cover to a vehicle when the locking pin is (re-)inserted into the shell under operational and non-operational conditions. The at least one locking pin is removable without functional damage from the shell up to 10 times or more. The depth of the protrusion depth on the locking pin lies in the range between 0.05 mm and 10 mm, preferably 0.6 mm. The shell material is a polycarbonate. The cover has at least one snap fit connector. The cover has at least two bias members arranged on the inner surface and on a peripheral wall of the cover.

One further aspect of the disclosures includes a cover fastening system for a vehicle that also includes a cover having at least one locking pin arranged on an inner surface of the cover, where the at least one locking pin has at least one protrusion; a shell, where the shell is mechanically engaged within a slot on a vehicle external surface. In this embodiment the locking pin is configured to cooperate with and mechanically engaged with the inner surface of the shell to retain the cover; and where the at least one locking pin is removable from the shell without functional damage.

One further aspect of the disclosure provided herein includes a cover fastening system for a vehicle external surface comprising a cover having at least one locking pin arranged on an inner surface of the cover, where the at least one locking pin has at least one protrusion, at least one snap fit connector, and at least one bias member; a shell, and where the shell is mechanically engaged within a slot on a vehicle external surface; where the locking pin is configured to cooperate and mechanically engaged with the inner surface of the shell.

In a further aspect the present disclosure provides a method for fastening a cover to a vehicle surface. The method comprises inserting at least one shell on to at least one locking pin on the cover to form a pin-shell assembly, the at least one locking pin having at least one protrusion in pressure contact with an inner wall of a hollow tube housing of the shell, with a tapered portion of the locking pin lying outside an open end of the hollow tube housing. Further, the cover is positioned on the mirror mounting area such that the pin-shell assembly aligns to a holding slot and at least one snap fit connector is in alignment to respective slots on the mirror mounting area on the vehicle surface. The cover is then pushed thereby inserting by force the pin-shell assembly into the slot, the said assembly engaging the said slot, and an outer wall of the hollow tube housing lying pressed against a threaded inner wall of the slot. The locking pin thus remains locked in the said slot as a result of engaging to the open end of the hollow tube housing a protruding member of the locking pin adjoining the tapered portion. The at least one snap fit connector having a top portion with a hook structure is adapted to be snap-fit within the slot on the mirror mounting area. The pin-shell assembly and the at least one snap fit connector securely mount the cover to the vehicle surface.

It should be noted that the features set out individually in the following description can be combined with each other in any technically advantageous manner and set out other forms of the present disclosure. The description further characterizes and specifies the present disclosure in particular in connection with the Figures.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
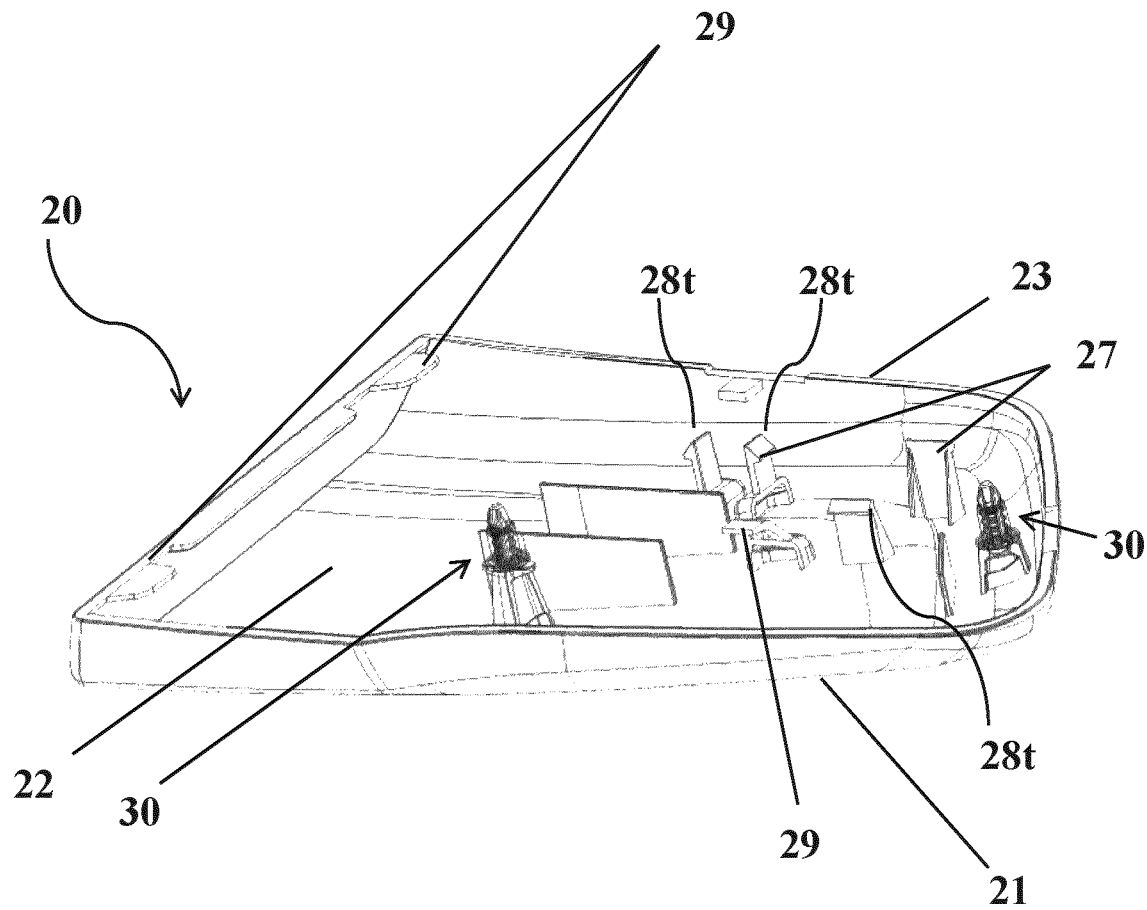
FIG. 1 shows a perspective view of the cover according to the present disclosure.

The following description is merely exemplary in nature and is not intended to limit the present disclosure, application, or uses. It should be understood that throughout the drawings, corresponding reference numerals indicate like or corresponding parts and features.

Figure 2:
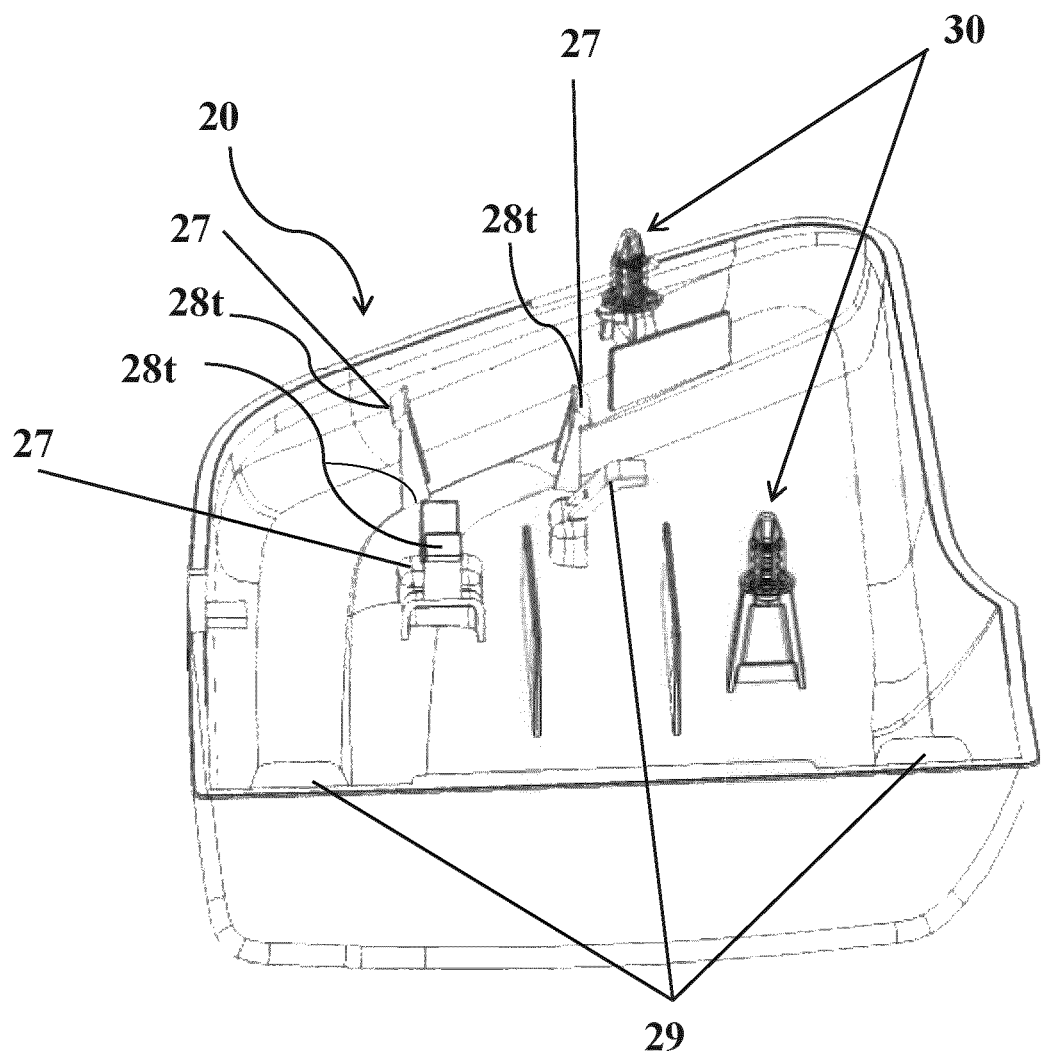
FIG. 2 shows a side perspective view of a cover according to the present disclosure.
Figure 3:
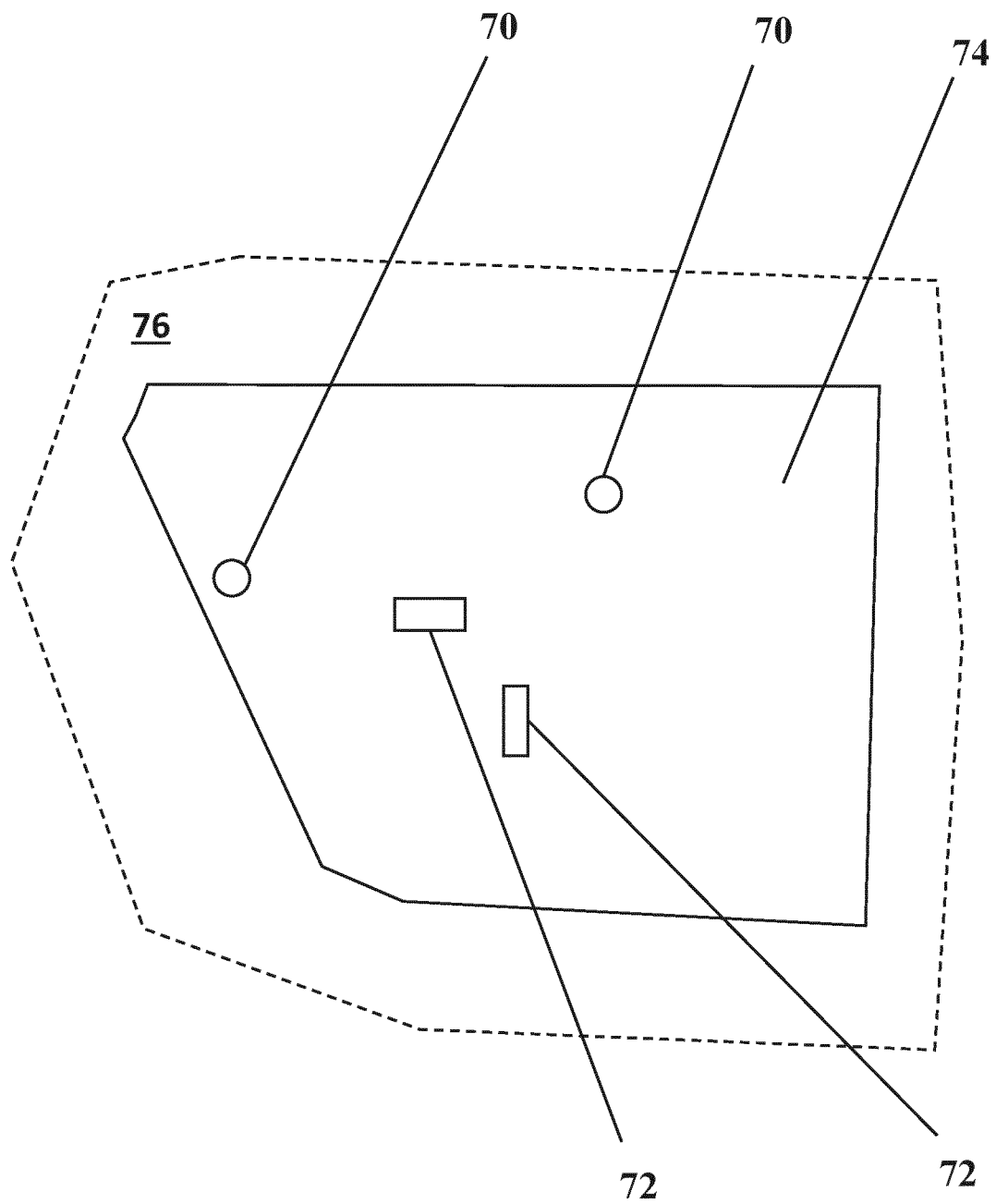
FIG. 3 illustrates a mirror mounting area on a vehicle surface according to the present disclosure.

Referring to FIGS. 1-3, FIG. 1 shows a top perspective view of a cover 20, FIG. 2 shows a side perspective view of the cover 20 and FIG. 3 illustrates, e.g. a mirror mounting area 74 on a vehicle surface 76. The cover 20 is used for concealing at least one slot on a mirror mounting area 74, FIG. 3 to the vehicle surface 76, FIG. 3. The cover 20 could be used when a mirror is replaced by a camera in an existing vehicle as described in this disclosure. However, this cover arrangement may also be utilized for a newly designed vehicle application. The at least one slot may be, for example, on a door area of the vehicle but could be located in any location interior or exterior where a cover would be used for aesthetic purpose. The exemplary cover has the same contour as the mirror mounting area 74, FIG. 3 and has an outer surface 21, an inner surface 22 and a peripheral wall 23 surrounding a periphery of the inner surface 22. The cover 20 in other forms may be of any contour shape and is not limited to contour of the mirror mounting area 74. The cover 20 may be attached to the mirror mounting area 74, FIG. 3 by means of at least one locking structure provided on the inner surface 22. The at least one locking structure being mechanically engaged or pressed into the appropriate holding slots 70, FIG. 3 or slots 72, FIG. 3 provided on the mirror mounting area 74, FIG. 3 thereby concealing the locking structures so as only the outer surface 21 of the cover 20 remains visible. The at least one locking structure may be one or more pin-shell assemblies 30 comprising a locking pin 25, FIG. 4 and a shell 50, FIG. 6a, one or more snap fit connectors 27, or a combination of one or more pin-shell assemblies 30 and one or more snap fit connectors 27. The at least one locking structure may be arranged at different positions on the inner surface 22 of the cover 20 to ensure proper attachment to the vehicle. Further, at least one biased member 29 is arranged on the inner surface 22 and on the peripheral wall 23 of the cover 20 for vibration damping. In this form, the pin-shell assembly 30 corresponds to the holding slot 70 and the snap fit connectors correspond to the slot 72 for assembly. In this form, the holding slot 70 is a threaded aperture.

As seen from FIGS. 1-2, the snap fit connectors 27 provide additional support to securely mount the cover 20 on the vehicle surface 76, FIG. 3. The snap fit connectors 27 are present as pairs in this form, each snap fit connector 27 has a top portion 28t and a bottom portion. The top portion 28t forms a sloping hook structure. The bottom portion is attached to the cover 20 whereas the hook structure helps to insert the snap fit connector 27 through slot 72, FIG. 3 provided for the snap fit connector 27 on the mirror mounting surface 74, FIG. 3. The hook structure is adapted to be snap-fit within the slot 72, FIG. 3 to securely mount the cover 20 to the vehicle surface 76, FIG. 3.

In a further aspect of the disclosure, as seen from FIGS. 1-2, at least one biased member 29 is arranged on the peripheral wall 23 of the cover 20 and in a region on the inner surface 22 near to the locking structures for vibration damping. In this form, three biased members 29 are arranged to help to attenuate vibrations on the cover. In addition, pads (not shown) may be arranged on a top surface of the at least one biased member 29 to prevent abrasions during pressed contact of the biased members when the cover 20 is mounted on the vehicle surface.

Figure 4:
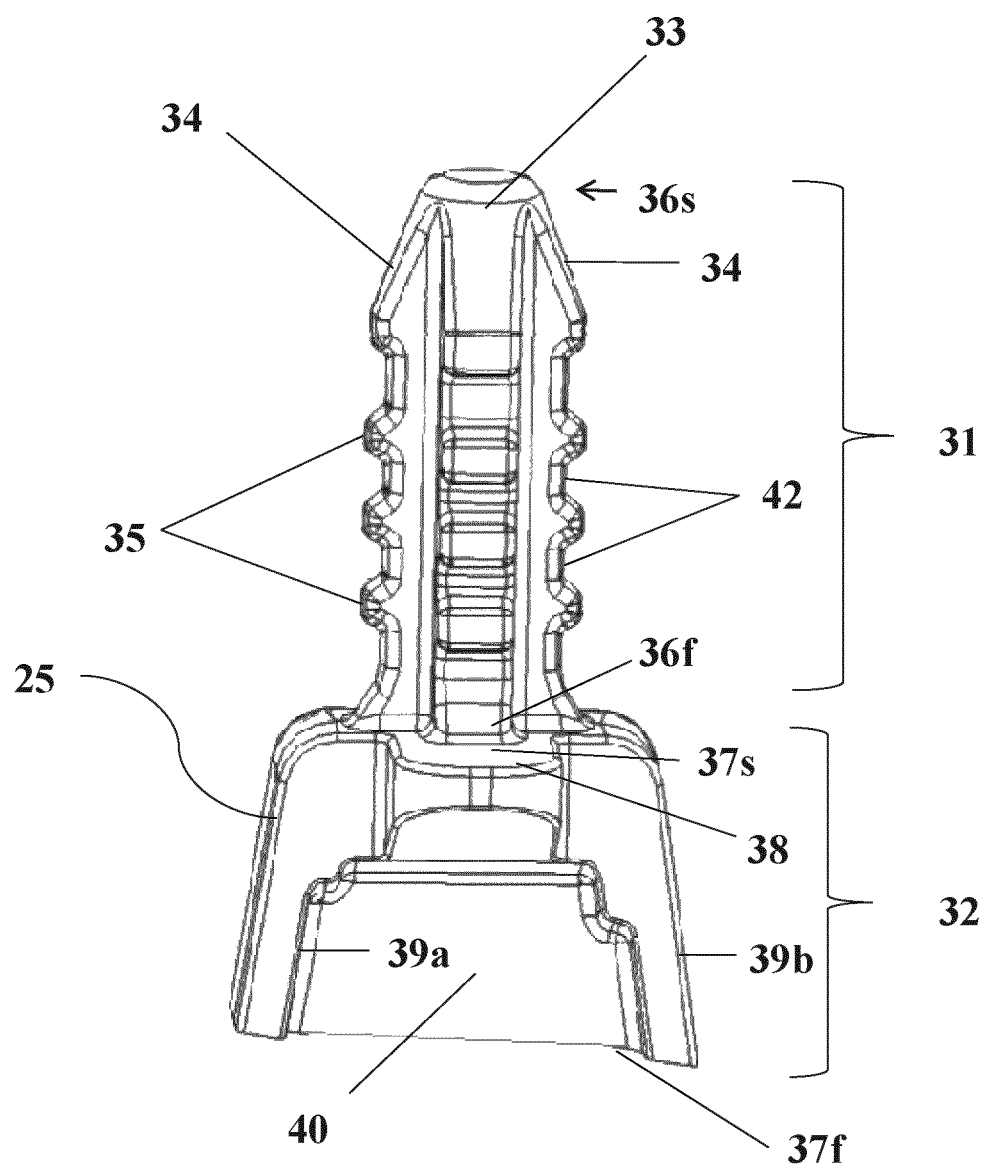
FIG. 4 shows a side perspective view of the locking pin structure according to the present disclosure.
Figure 5:
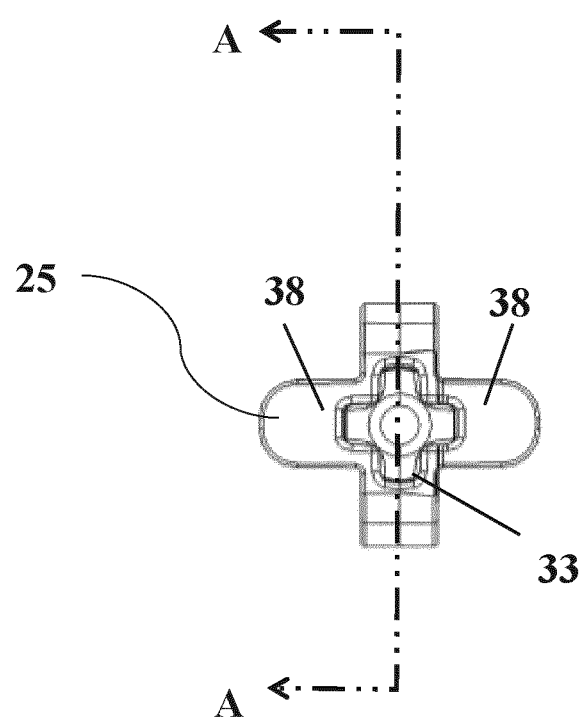
FIG. 5 shows a top view of the locking pin structure according to the present disclosure.

Referring to FIGS. 4-5, the exemplary locking pin 25 has a first portion 31 and a second portion 32. The first portion 31 has a central stem 33 provided with two or more protruding members 34 on either side of the central stem 33. Each protruding member 34 having protrusions 35 and recesses 42 extending along the entire length of the protruding member 34. Each protrusion 35 is equidistantly spaced from each other protrusion 35 and in this form has a depth in the range of 0.05 mm to 10 mm (preferably 0.6 mm). The first portion 31 has a first end 36f and a second end 36s. The second end 36s is flattened at the top with the protruding member 34 tapering towards it forming a tapered portion 64, FIG. 7.

A second portion 32 has a first end 37f and a second end 37s. The first end 37f of the second portion 32 is fixed to the cover 20 whereas the second end 37s is in connection with the first end 36f of the first portion 31. The second end 37s of the second portion 32 is provided with a stop arrangement comprising an extended flap structure 38 on opposite sides of the second portion shown in FIG. 5. The flap structure 38 prevent further movement of the locking pin 25 into a shell 50, FIG. 6 when the first portion 31 of the locking pin 25 is inserted into a first open end 52, FIG. 6 of the shell 50, FIG. 6. The body of the second portion 32 has a trapezoidal shape and is provided with a first leg 39a and a second leg 39b with a connecting region 40 linking both the legs. The size of the second portion body 32 can be modified to design requirements and is not limited to the example shown in FIG. 4. The height of the second portion body 32 may be based on the distance needed to secure the first portion 31 in the shell 50. A section line A-A of the locking pin 25 inserted into the shell 50 is illustrated for use in FIG. 7b.

Figure 6A:
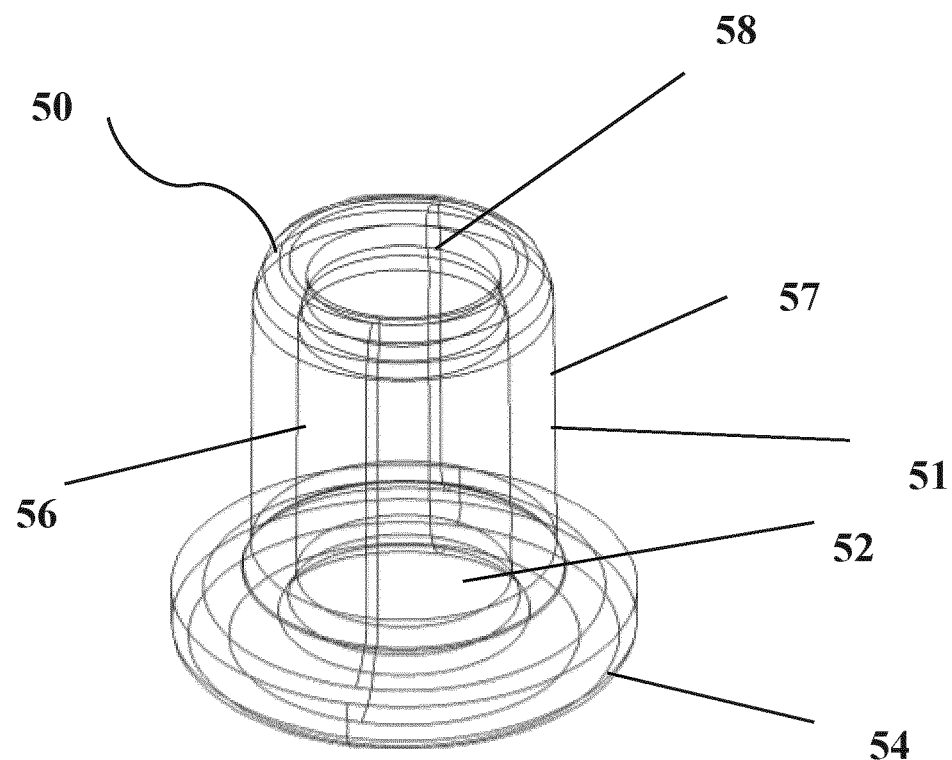
FIG. 6a is a side perspective view of the shell according to the present disclosure.
Figure 6B:
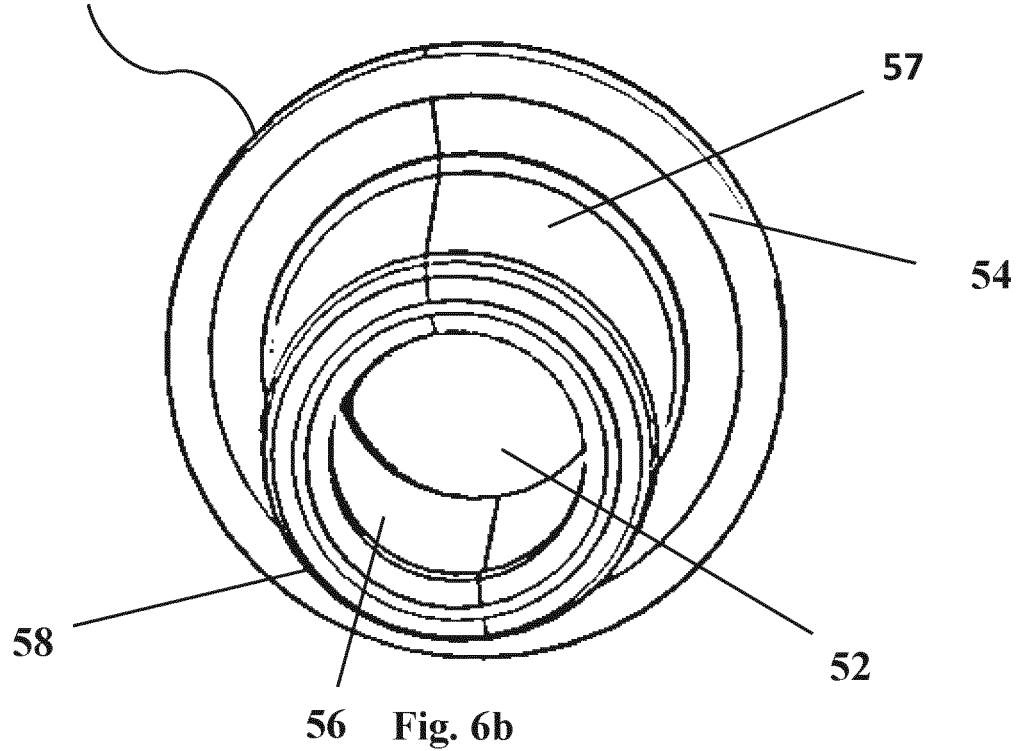
FIG. 6b is a top perspective view of the shell according to the present disclosure.

FIG. 6a is a side perspective view of the shell 50 and FIG. 6b is a top perspective view of shell 50. The shell 50 is preferably made of polycarbonate or any similar material. The shell is inserted on to the locking pin 25 of the cover 20 to form a pin-shell assembly 30, before attaching the cover on to the mirror mounting area 74, FIG. 3. The cover 20 is positioned on the mirror mounting area 74, FIG. 3, such that the pin-shell assembly 30 aligns to the holding slot 70, FIG. 3 and is inserted by force the pin-shell assembly into the holding slot 70, FIG. 3. The shell 50 provides a shielded surface for the locking pin 25 when the locking pin 25 and shell 50 are engaged in the holding slot provided on the vehicle thus enabling removal of the cover without functional damage to the locking pin 25. Functional damage is considered to be structural damage to the locking pin where the locking pin is not capable of retaining the cover to a vehicle when the locking pin is inserted into the shell under operational and non-operational conditions. The shell 50 has a hollow tube housing 51 having an outer wall 57 and inner wall 56.

Figure 7A:
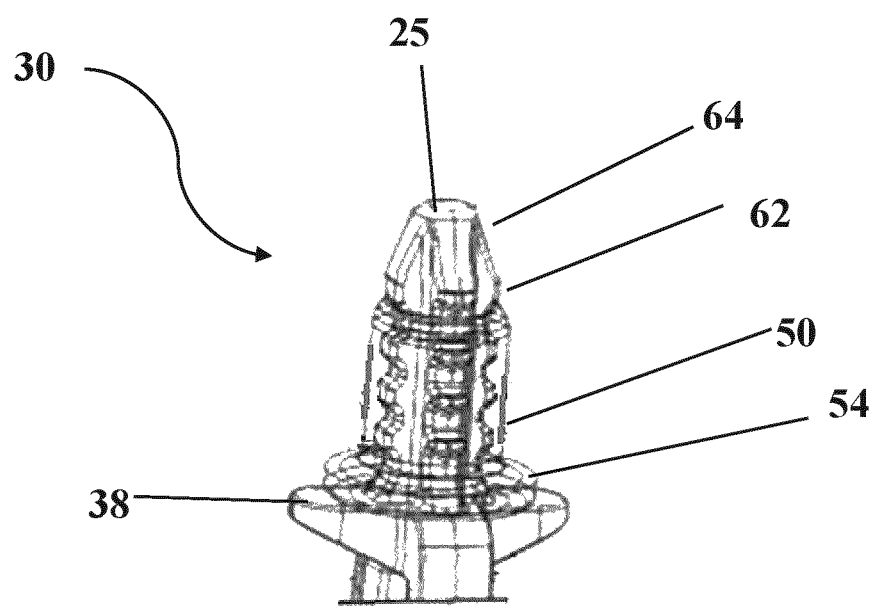
FIG. 7a shows a perspective view of the shell in engagement with the pin according to the present disclosure.
Figure 7B:
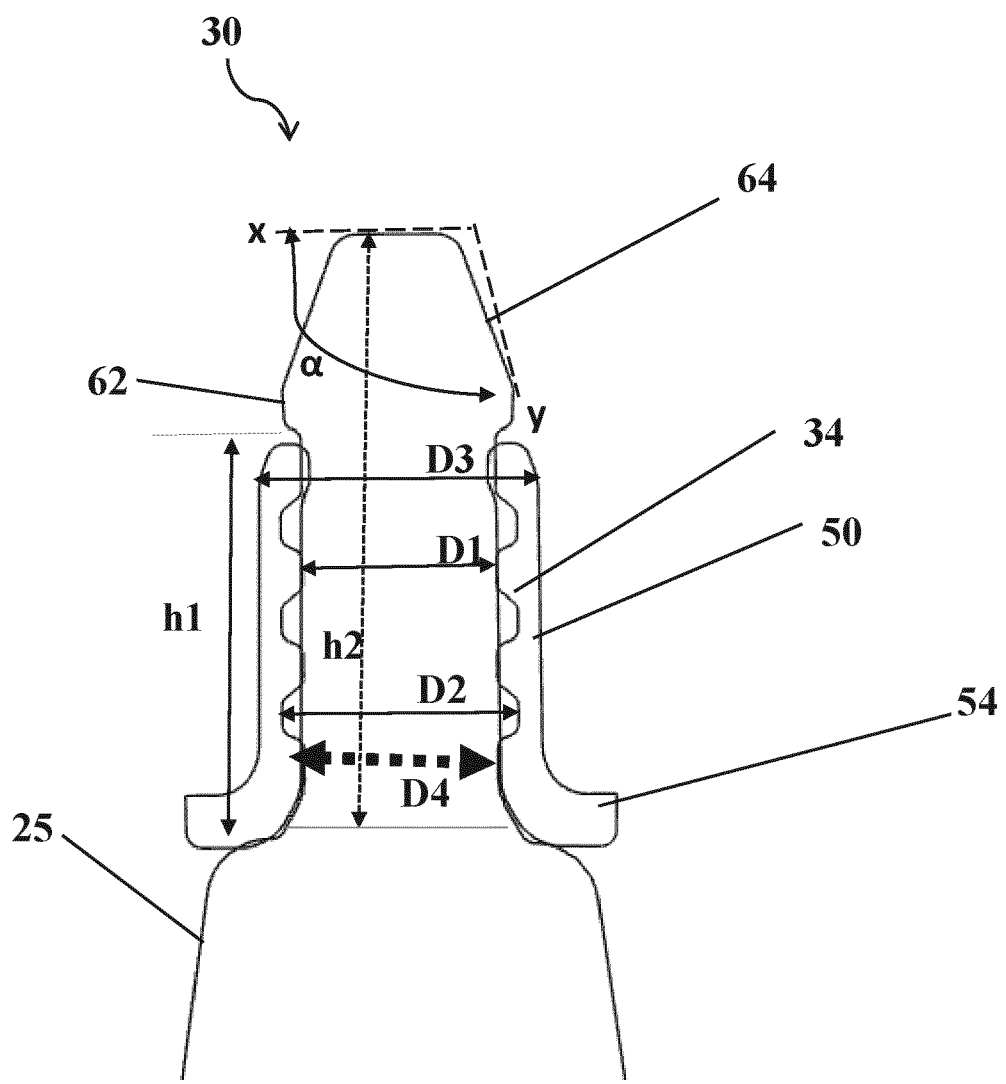
FIG. 7b shows a sectional view of the shell in engagement with the pin according to the present disclosure.

The hollow tube housing 51 is open on both ends and on a first open end 52 is provided a circumferentially extending outer lip 54, wherein the diameter of the circumferentially extending outer lip 54 is greater than the diameter of the hollow tube housing 51. The outer lip 54 functions as a stop preventing further movement of the shell 50 into the holding slot 70, FIG. 3 on the vehicle. The hollow tube housing 51 provides an insertion path for the locking pin 25 structure as shown by FIG. 7a and FIG. 7b and the first portion 31 of the locking pin 25 is inserted into the first open-end 52, FIG. 5 of the hollow tube housing 51. Once the locking pin is inserted into the shell 50 a pin-shell assembly 30 is created. FIG. 7B is a sectional view along a section line A-A of the locking pin 25 inserted into the shell 50 with the section A-A line illustrated in FIG. 5. When the locking pin 25 is pressed into the shell 50, the protrusions are in pressure contact with the inner wall 56 of the hollow tube housing 51 causing the inner wall 56 to deform. Thus the protrusions grip the inner wall 56 of the shell 50, with the tapered portion 64 lying outside a second open end 58 of the hollow tube housing 51 of the shell 50. The locking pin 25 with the shell 50 is press inserted in the holding slots 70, FIG. 3 provided on the mirror mounting area 74, FIG. 3 and the outer wall 57 of the hollow tube housing 51 of the shell 50 is held in a pressure contact with a threaded inner wall of the holding slot 70, FIG. 3. The pressure exerted by the locking pin 25 on the inner wall 56 of the tube housing 51 causes the outer wall 57 of the hollow tube housing 51 of the shell to lie pressed against the threaded inner wall of the holding slot 70, FIG. 3 which ensures a strong contact between the outer wall 57 of the hollow tube housing 51 and threaded inner wall of the holding slot 70. FIG. 3. The tapered portion 64, FIG. 7 of the locking pin 25 lies within a cavity of the holding slot 70, FIG. 3 when the pin 25 with the shell 50 is engaged in the holding slot 70, FIG. 3. Further, the first protrusion 62 on each protruding member 34 adjoining the tapered portion 64, FIG. 7 of the locking pin 25 engages an outer surface of the second open end 58, FIG. 6a thereby locking the locking pin 25 and preventing the locking pin 25 from sliding out of the shell 50. When the locking pin 25 is pressed into the shell 50, the flap structure 38 comes in contact with the outer lip 54, FIG. 6a preventing further movement of locking pin 25 into the shell 50. Locking pin 25 is configured to be removable from the shell 50 with no or minimal damage to the locking pin 25 for up to 10 times or more. Minimal damage to the locking pin is defined as damage which does not affect the structural integrity of the locking pin 25 ability to retain in the shell 50. This allows for the cover 20 to have an assembly/disassembly function eliminating the replacement with a new cover if disassembly occurs. An exemplary force necessary to push the locking pin 25 into the holding slot 70, FIG. 3 when the cover 20 is to be engaged in the mirror mounting area 74, FIG. 3 or pull locking pin 25 from the holding slot when the cover 20 is to be disengaged from the mirror mounting area 74. FIG. 3 lies in the range between 20 Newtons and 200 Newtons. The required forces may vary depending on the size of cover 20 and the locking pin 25. The shell 50 may remain within the holding slot 70, FIG. 3 or move out together with the locking pin 25 on removal of the cover 20. The shell portion 50 may still require replacement after the locking pin 25 is removed.

Figure 8:
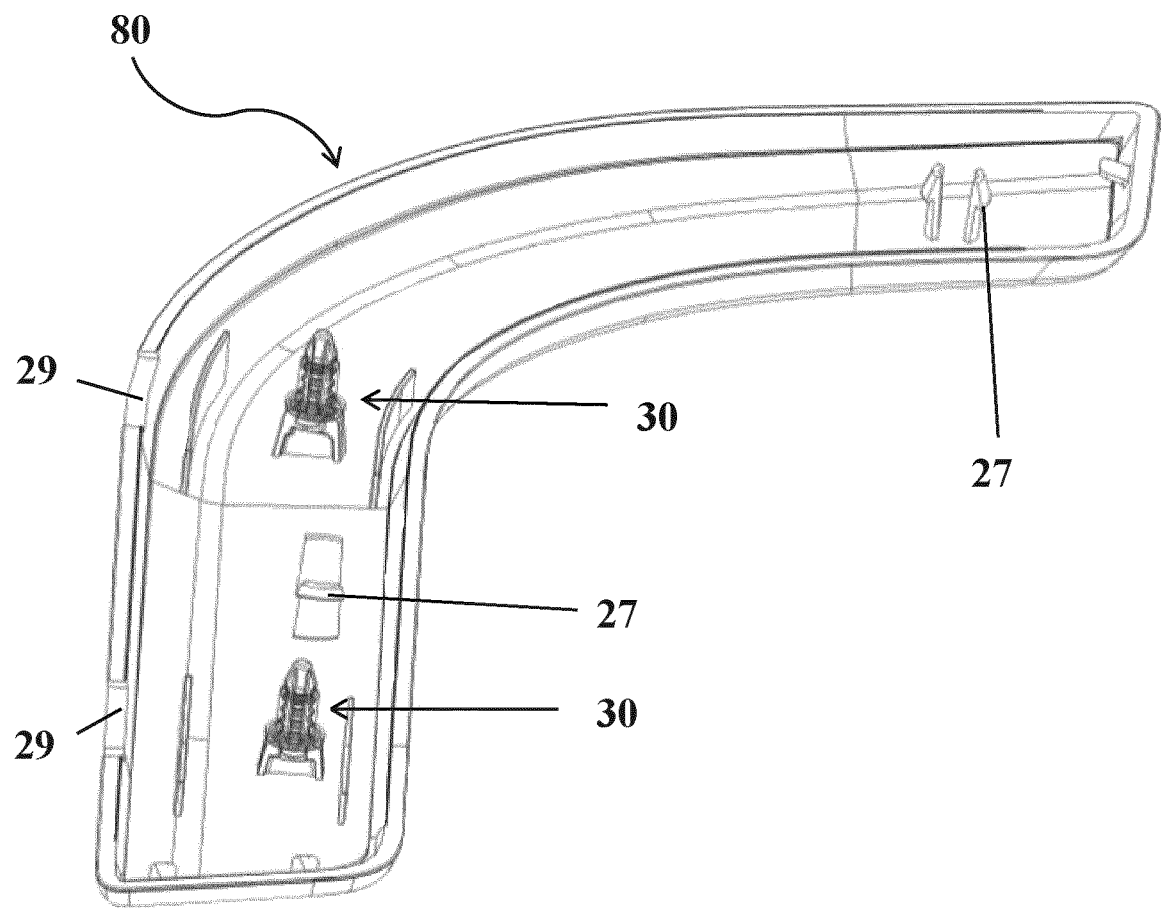
FIG. 8 illustrates a top perspective view of an L-shaped cover according to the present disclosure.
Figure 9:
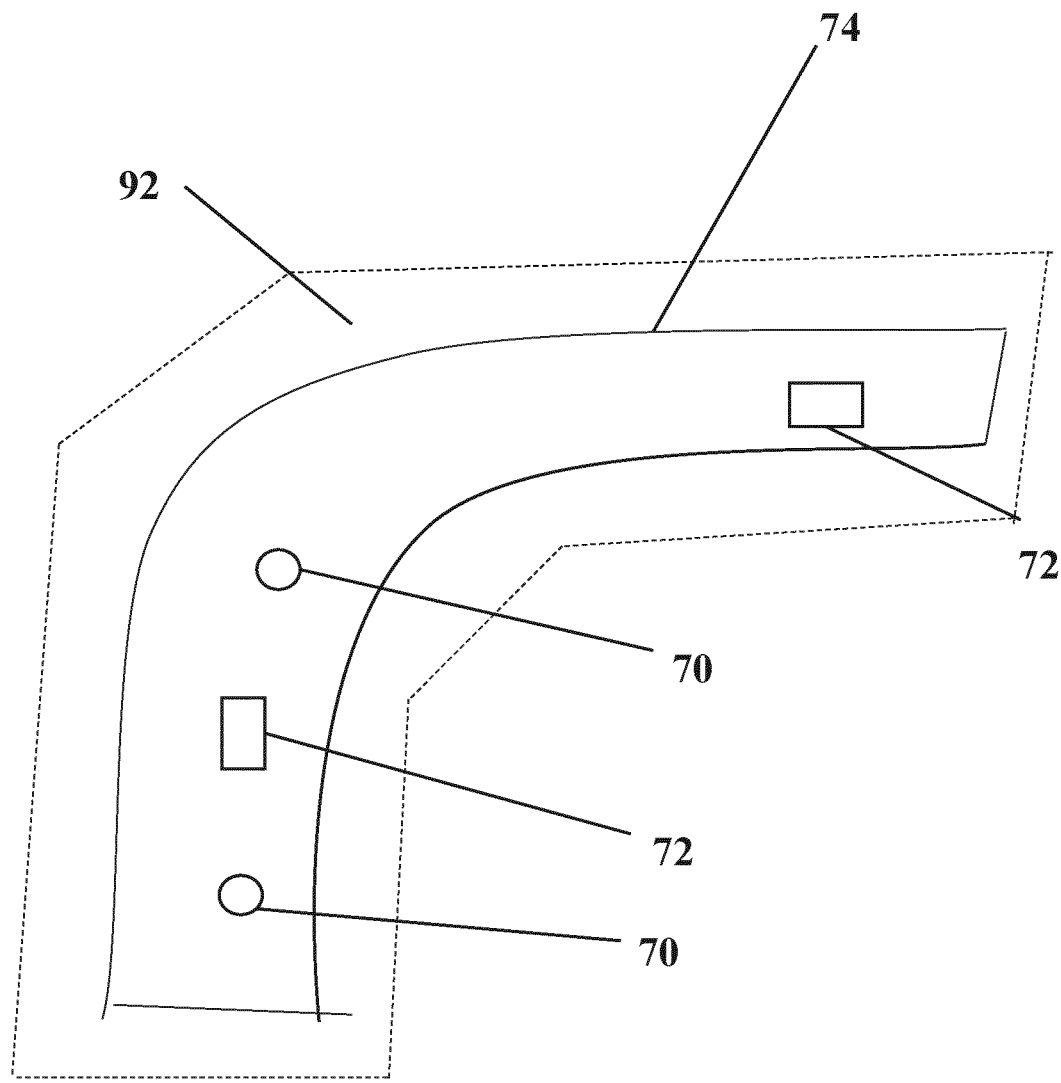
FIG. 9 illustrates a mounting area on a vehicle surface for an L-shaped cover according to the present disclosure.

Another exemplary representation of the present disclosure is shown by FIG. 8 which shows an L-shaped cover 80 with the locking pins 25, snap fit connectors 27 and biased members 29. The L-shaped cover 80 is suited for the upper region of door 92, especially for long vehicles, to cover slots provided for Class V mirrors. The mounting area 74 on the vehicle with the slots 70 for the locking pins 25 and slots 72 for the snap fit connecters 27 of the L-shaped cover 80 is shown in FIG. 9.

The dimensions of the snap fit connectors 27, locking pins 25 and shell 50 are dependent on the dimensions of the holding slot 72 and the contour of the cover 20, 80 and may be adjusted according to desired design parameters. Referring to FIG. 7b, a diameter D1 of the locking pin is in a range from 0.5 mm to 20 mm; a diameter D2 of the locking pin 25 lie in the range from 1 mm to 22 mm and an outer diameter D3 of the shell 50 may lie in the range from 2 mm to 25 mm; and an inner diameter D4 (represented as thick dotted lines in FIG. 6b) of the shell may lie in the range from 0.5 mm to 20 mm. The height h1 of the shell 50 may lie in the range from 2 mm to 25 mm and height h2 (represented as dashed line in FIG. 7b) of the first portion 31 of the locking pin 25 lie in the range from 5 mm to 30 mm. An inclination angle α measured between x and y lie in the range from 90° to 160°. The dimensions of the locking pin 25 and the shell are interdependent and may vary to ensure proper fit depending on the dimension and nature of the holding slot. In an exemplary variation, if the height of the first portion of the locking pin 25 structure is 11.5 mm and width from one protrusion to the other protrusion is 3.6 mm, then ideally the shell 50 should have a height of 7.7 mm with an outer diameter of 5.3 mm and an inner diameter of 3.4 mm with an angle α of 109.96°. Manufacturing tolerance may also be factored in to determining the dimensions of the shell 50, holding slot 70, cover 20, 80 and the locking pins 25 and the snap fit connectors 27 shown in FIG. 1, FIG. 8 and described above are set at different positions on the cover 20, 80 and are on different planes. However it is within the scope of this disclosure the locking pins may be on same plane or on different planes based on design of the cover 20, 80 to match the slots on the mounting surface to enable proper fit. The cover 20, 80 with the locking structures, members are molded as a single part and made from thermoplastics such as Acrylonitrile Butadiene Styrene (ABS), Acrylonitrile styrene acrylate (ASA), Acrylonitrile Butadiene Styrene-polycarbonate blend (ABS-PC), Polycarbonate (PC) or Acrylonitrile styrene acrylate-polycarbonate blend (ASA-PC). The cover is manufactured to match shape of the mounting area on to which it is to be attached.

The foregoing description of various preferred forms have been presented for purposes of illustration and description. It is not intended to be exhaustive or to limit the disclosure to the precise forms disclosed, and obviously many modifications and variations are possible in light of the above teaching. The example forms, as described above, were chosen and described in order to best explain the principles of the disclosure and its practical application to thereby enable others skilled in the art to best utilize the disclosure in various forms and with various modifications as are suited to the particular use contemplated. The features of the disclosure disclosed in the foregoing description, in the drawings and in the claims can be essential both individually and in any combination for the implementation of the disclosure in its various forms.

REFERENCE SIGN LIST

20—Cover
21—Outer Surface
22—Inner Surface
23—Peripheral Wall
25—Locking Pin
27—Snap Fit Connector
28t—top portion
29—Biased Member
30—Pin-Shell Assembly
31—First Portion
32—Second Portion
33—Stem
34—Protruding Member
35—Protrusion
36f—First end
36s—Second end
37f—First end
37s—Second end
38—Flap Structure
39a—First Leg
39b—Second Leg
40—Connecting Region
42—Recess
50—Shell
51—Housing
52—First Open End
54—Outer Lip
56—Inner Wall
57—Outer Wall
58—Second Open End
62—First Protrusion
64—Tapered Portion
70—Holding Slot
72—Slot
74—Mirror Mounting Area
76—Vehicle Surface
80—L-Shaped Cover
92—Door

The invention claimed is:

1. A cover fastening system for a vehicle external surface, comprising;
   a cover having at least one locking pin arranged on an inner surface of the cover,
   a shell having a hollow tube housing with an open end and having an inner wall, wherein the shell is mechanically engaged within a slot on a vehicle surface;
   wherein the locking pin cooperates with the inner wall of the hollow tube of the shell to retain the cover such that the tapered portion of the locking pin lies outside the open end of the hollow tube housing,
   wherein the locking pin has a first portion having a central stem provided with two or more protruding members on either side of the stem, wherein each protruding member has protrusions and recesses, and has a first end and a second end, wherein the second end is flattened at the top with the protruding member tapering towards it forming a tapered portion, and wherein the locking pin has a second portion having a first end fixed to the cover and a second end in connection with the first end of the first portion,
   such that, when the locking pin is pressed into the shell, the protrusions are in pressure contact with the inner wall of the hollow tube housing causing the inner wall to deform, with the protrusions gripping the inner wall of the shell, and with the tapered portion lying outside a second open end of the hollow tube housing of the shell.

2. The cover fastening system of claim 1, wherein the at least one locking pin is removable from the shell without functional damage.

3. The cover fastening system of claim 2, wherein the at least one locking pin is removable from the shell up to 10 times without functional damage.

4. The cover fastening system of claim 1, wherein a depth of the at least one protrusion is in a range of 0.05 mm to 10 mm.

5. The cover fastening system of claim 1, wherein the shell is made from a material selected from acrylonitrile butadiene styrene, acrylonitrile acrylate, acrylonitrile butadiene styrene polycarbonate blend, polycarbonate, and acrylonitrile styrene acrylate polycarbonate blend.

6. The cover fastening system of claim 1, wherein the cover has at least one snap fit connector.

7. The cover fastening system of claim 1, wherein the cover has at least one bias member arranged on the cover.

8. A cover fastening system for a vehicle external surface, comprising:
   a cover having at least one locking pin arranged on an inner surface of the cover, wherein the at least one locking pin has at least one snap fit connector, and at least one bias member;
   a shell having a hollow tube housing with an open end and having an inner wall, wherein the shell is mechanically engaged within a slot on a vehicle external surface; and
   wherein the locking pin mechanically engaged with the inner wall of the hollow tube of the shell such that the tapered portion of the locking pin lies outside the open end of the hollow tube housing,
   wherein the locking pin has a first portion having a central stem provided with two or more protruding members on either side of the stem, wherein each protruding member has protrusions and recesses, and has a first end and a second end, wherein the second end is flattened at the top with the protruding member tapering towards it forming a tapered portion, and wherein the locking pin has a second portion having a first end fixed to the cover and a second end in connection with the first end of the first portion,
   such that, when the locking pin is pressed into the shell, the protrusions are in pressure contact with the inner wall of the hollow tube housing causing the inner wall to deform, with the protrusions gripping the inner wall of the shell, and with the tapered portion lying outside a second open end of the hollow tube housing of the shell.

9. A cover fastening method for a vehicle surface, comprising:
   inserting at least one shell on to at least one locking pin on the cover to form a pin-shell assembly, the at least one locking pin in pressure contact with an inner wall of a hollow tube housing of the shell, with a tapered portion of the locking pin lying outside an open end of the hollow tube housing;
   positioning the cover on a mirror mounting area, such that the pin-shell assembly aligns to a holding slot;

inserting by a force, the pin-shell assembly into the holding slot, the pin-shell assembly engaging the holding slot, and an outer wall of the hollow tube housing lying pressed against an inner wall of the holding slot, and locking the locking pin in the said slot as a result of engaging to the open end of the hollow tube housing protruding members of the locking pin adjoining the tapered portion, wherein the locking pin has a first portion having a central stem provided with two or more protruding members on either side of the stem, wherein each protruding member has protrusions and recesses, and has a first end and a second end, wherein the second end is flattened at the top with the protruding member tapering towards it forming the tapered portion, and wherein the locking pin has a second portion having a first end fixed to the cover and a second end in connection with the first end of the first portion, such that, when the locking pin is pressed into the shell, the protrusions are in pressure contact with the inner wall of the hollow tube housing causing the inner wall to deform, with the protrusions gripping the inner wall of the shell, and with the tapered portion lying outside a second open end of the hollow tube housing of the shell.

10. The cover fastening method of claim 9, wherein a force required to push the pin-shell assembly into the holding slot when the cover is to be engaged in the mounting area or to pull the locking pin from the holding slot when the cover is to be disengaged from the mounting area is between 20 Newtons and 200 Newtons.

11. The cover fastening system of claim 1, wherein each of the two or more protruding members has protrusions and recesses extending along an entire length of the protruding member, with each protrusion being equidistantly spaced from each other protrusion.

12. The cover fastening method of claim 9, wherein each of the two or more protruding members has protrusions and recesses extending along an entire length of the protruding member, with each protrusion being equidistantly spaced from each other protrusion.

13. The cover fastening system of claim 8, wherein each of the two or more protruding members has protrusions and recesses extending along an entire length of the protruding member, with each protrusion being equidistantly spaced from each other protrusion.

\* \* \* \* \*